United States Patent
Williams et al.

(10) Patent No.: US 11,030,840 B2
(45) Date of Patent: *Jun. 8, 2021

(54) WEARABLE DEVICE WITH USER AUTHENTICATION INTERFACE

(71) Applicant: PAYPAL, INC., San Jose, CA (US)

(72) Inventors: Megan Marie Williams, San Jose, CA (US); Michael Hwang, San Francisco, CA (US); Michelle Serrano, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,858

(22) Filed: Jan. 27, 2020

(65) Prior Publication Data

US 2020/0273275 A1 Aug. 27, 2020

Related U.S. Application Data

(63) Continuation of application No. 14/527,458, filed on Oct. 29, 2014, now Pat. No. 10,546,439.

(51) Int. Cl.
*G07C 9/28* (2020.01)
*G06F 1/16* (2006.01)

(52) U.S. Cl.
CPC .............. *G07C 9/28* (2020.01); *G06F 1/163* (2013.01)

(58) Field of Classification Search
CPC ........ G07C 9/28; G07C 9/00111; G06F 1/163; G06F 1/1677; G04G 21/02; G04G 21/08; G04G 21/00; G04R 20/26
USPC ......... 340/5.1, 5.2, 5.21, 5.4, 5.41, 5.6, 5.61, 340/5.7–5.73, 5.8
See application file for complete search history.

(56) References Cited

U.S. PATENT DOCUMENTS 9,824,244 B1 * 11/2017 Hopkins, III ........... G06F 21/35
2016/0037345 A1 * 2/2016 Margadoudakis .... H04W 12/04
455/411

* cited by examiner

*Primary Examiner* — Brian Wilson
(74) *Attorney, Agent, or Firm* — Haynes and Boone, LLP

(57) ABSTRACT

A wearable device is used to authenticate a user into a user account at a user device of the user. In particular, the wearable device may include a sensor configured to detect whether the wearable device is worn by or is with the user. If so, the wearable device may send a signal to the user device and the user device may authenticate the user based on the signal received from the wearable device. For example, when the sensor detects that the wearable device is worn by the user, the wearable device may send a unique signal periodically, such as every five seconds or every 10 seconds. Based on whether the unique signal from the wearable device is received, the user device may authenticate the user.

20 Claims, 7 Drawing Sheets

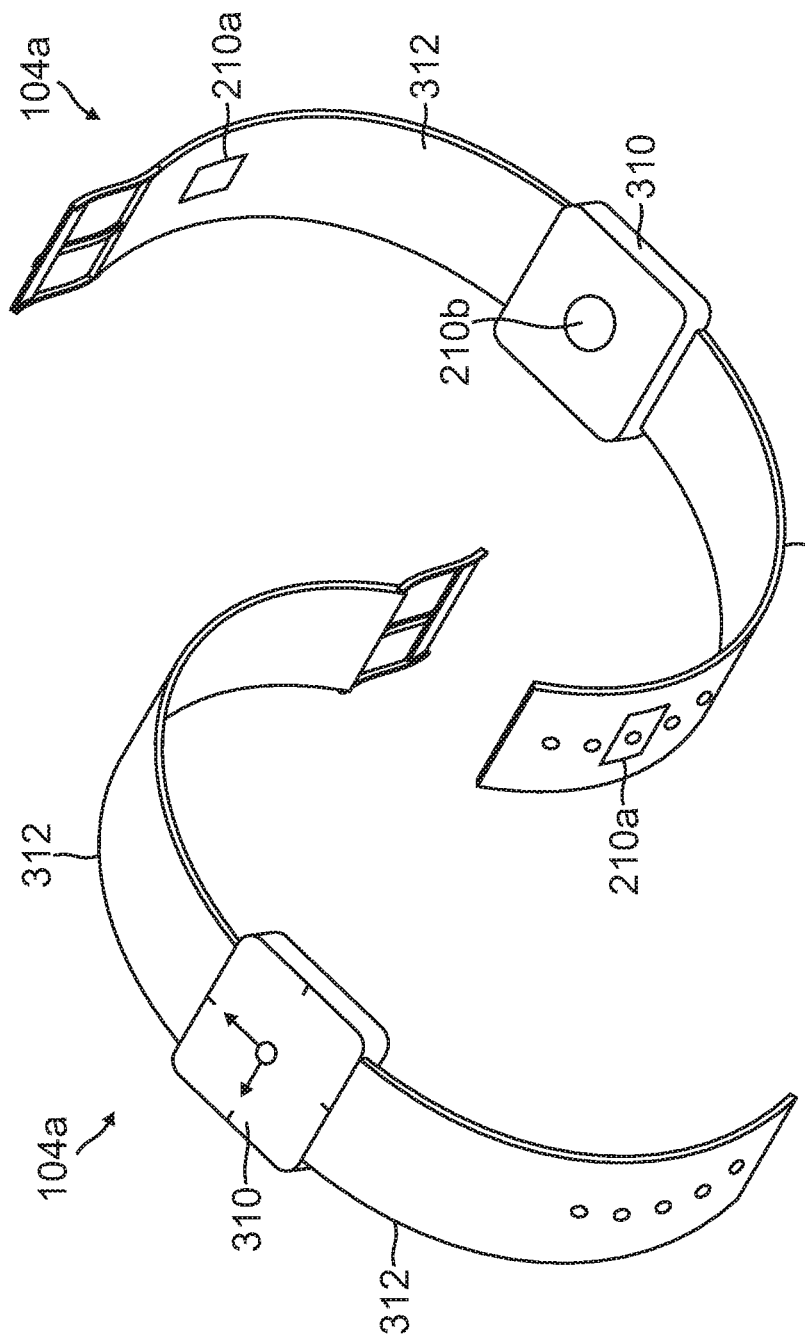

WEARABLE DEVICE WITH USER AUTHENTICATION INTERFACE

CROSS-REFERENCE TO RELATED APPLICATIONS

This application is a continuation of U.S. patent application Ser. No. 14/527,458, filed Oct. 29, 2014, which is incorporated herein by reference in its entirety.

BACKGROUND

Field of the Invention

The present invention generally relates to wearable devices, and more particularly, to systems and methods for implementing authentication via the wearable devices.

Related Art

With the popularity of internet and online commerce, consumers increasingly are using online services for various transactions and interactions. For example, consumers may shop online, make electronic payments, and/or communicate electronically via email services or instant message services. Many of the online services require consumers to set up an account and login credentials. Consumers are then required to log in, such as entering a login ID and password, to be authenticated before consumers may use the services. Thus, the authentication process may be inconvenient for a consumer, especially when the consumer has a plurality of different service accounts that require different authentication credentials. Consequently, there is a need for an easier way to authenticate a consumer that is both secure and convenient.

BRIEF DESCRIPTION OF THE FIGURES

FIG. 3A is a diagram illustrating a perspective front view of a watch type wearable device according to one embodiment.

FIG. 3B is a diagram illustrating a perspective rear view of the watch type wearable device of FIG. 3A according to one embodiment.

Figure 1:
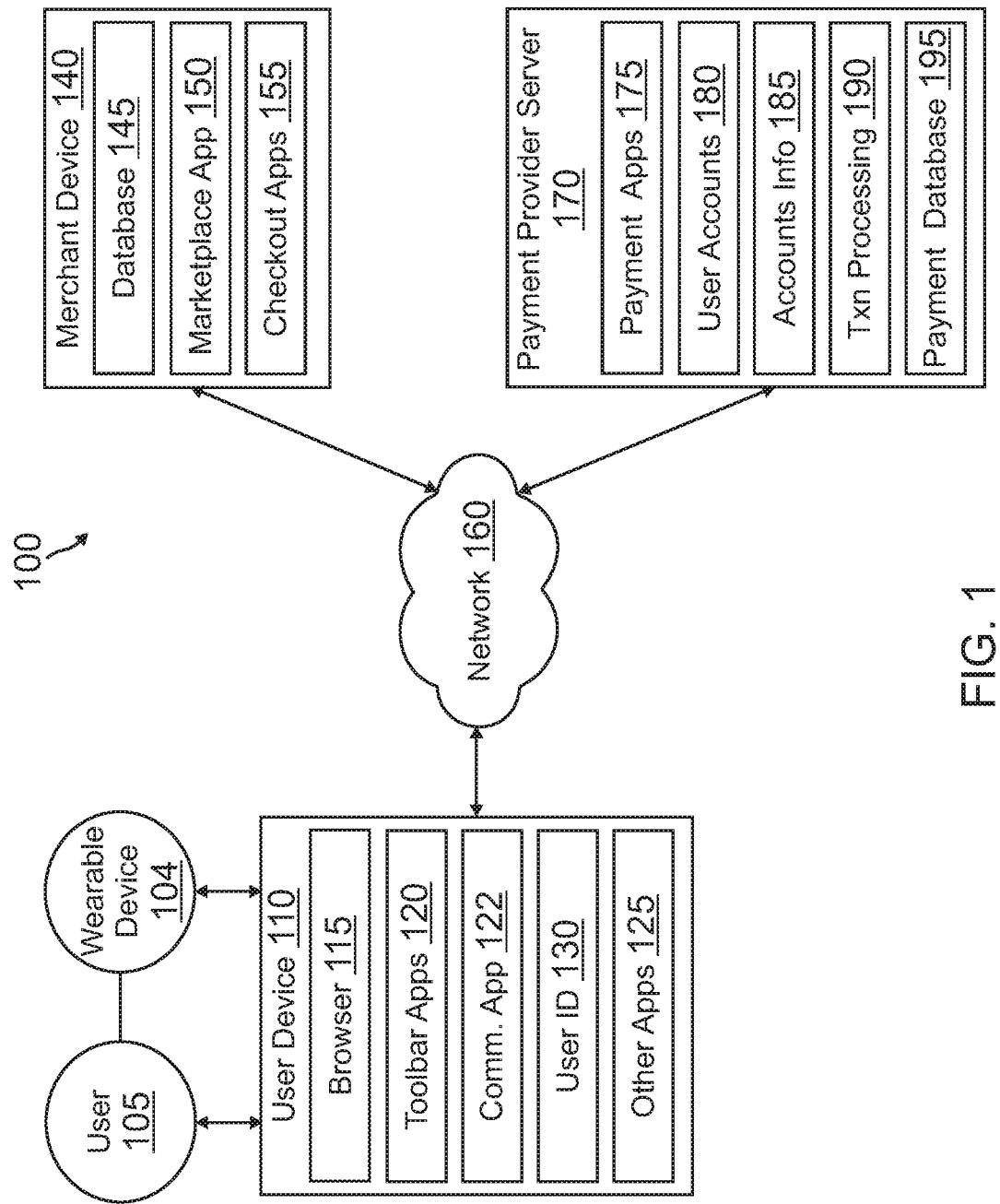
FIG. 1 is a block diagram of a networked system suitable for implementing wearable devices for user authentication according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a wearable device is used to authenticate a user into a user account at a user device of the user. In particular, the wearable device may include a sensor, such as an optical sensor or a pressure sensor, configured to detect whether the wearable device is worn by or is with the user. If so, the wearable device may send a signal, such as a short range wireless signal, Bluetooth Low Energy or the like, to the user device and the user device may authenticate the user based on the signal received from the wearable device.

In an embodiment, the wearable device may include a sensor configured to detect whether the wearable device is worn by the user. When the sensor detects that the wearable device is worn by the user, the wearable device may send a unique signal periodically, such as every five seconds or every 10 seconds. When the sensor detects that the wearable device is taken off or otherwise separated from the user, the wearable device may stop sending the unique signal. Based on whether the unique signal from the wearable device is received, the user device may authenticate the user.

In an embodiment, the sensor of the wearable device may be provided at an inner surface of the wearable device facing the user when the wearable device is worn by the user. The sensor may be an optical sensor configured to detect ambient light level. When the wearable device is worn by the user, the optical sensor may be covered by a body part of the user and may not receive light. When the wearable device is taken off from the user, the optical sensor may be exposed and may receive light. As such, the optical sensor may detect whether the wearable device is worn by the user.

In an embodiment, the sensor of the wearable device may be an actuator, such as a button, which may be depressed when the wearable device is worn by the user and may be released when the wearable device is taken off the user. In another embodiment, the sensor may be a temperature sensor configured to detect a temperature. For example, the temperature sensor may detect a body temperature of the user when the wearable device is worn by the user and may detect ambient temperature of the user when the wearable device is taken off from the user. In still another embodiment, the sensor may be a proximity sensor configured to detect a presence of the user when the wearable device is worn by the user. In yet another embodiment, the sensor may be a pressure sensor or touch sensor configured to detect a pressure force or a touch from the user when the wearable device is worn by the user. Other sensors, such as a gyroscope, accelerometer, and the like, also may be used to detect an orientation and movement of the wearable device to determine whether the wearable device is worn by the user or has been taken off from the user.

In an embodiment, a user may set up the wearable device to be used for user authentication with the user device. The user may designate or associate the wearable device for user authentication with certain accounts of the user. In an embodiment, one wearable device may be used for user authentication of multiple different user accounts. In another embodiment, multiple wearable devices may be used in combination for user authentication of a particular user account. As such, various combinations of wearable devices may be used for user authentication of different user accounts.

In an embodiment, the user device may automatically authenticate the user for a user account without requiring the user to enter credentials, such as passwords or login IDs, when the user device receives the unique signal from the wearable device indicating that the wearable device is still worn by the user. In another embodiment, the user device may require a login credential for the initial login and may keep the user logged in as long as the user device receives the unique signal from the wearable device indicating that the wearable device is still worn by the user. The user device may log the user out of the account when the user device no longer receives the unique signal from the wearable device indicating that the wearable device is no longer worn by the user or is separated from the user. In an embodiment, if the user is logged out and the user device receives the unique signal from the wearable device, the user device may still require the user to provide credentials for logging in. The user device may keep the user logged in thereafter as long as the user device continues to receive the unique wireless signals from the wearable device.

In an embodiment, the wearable device may be a watch type device configured to provide time related information and be worn by the user. In another embodiment, the wearable device may be a jewelry type item, such as a ring, a necklace, a wrist band, and the like. In still another embodiment, the wearable device may be a belt, a neck tie, a tie pin, a collar stay, and any other wearable accessories. In still another embodiment, the wearable may be a clip or a tab configured to be attached to the user or other items carried by the user.

FIG. 1 is a block diagram of a networked system suitable for implementing wearable devices for user authentication according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. A wearable device 104 may be worn by user 105 and may communicate with user device 110. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, the user 105 may have a payment account at the payment provider server 170. The payment account may allow user 105 to purchase and/or pay for various products or services at a merchant. The user 105 may be required to enter credentials for user authentication at the user device 110 to access and use the payment account. The wearable device 104 may be associated with the payment account of the user 105 and be used for user authentication. The wearable device 104 may emit a wireless signal, such as Bluetooth signal, Bluetooth Low Energy (BLE) signal, or other Near-Field Communication (NFC) signal, to indicate that the wearable device 104 is worn by the user 105. The user device may authenticate the user 105 based on the signal emitted from the wearable device 104.

User device 110, merchant server 140, payment provider server 170, and wearable device 104 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, laptop computer, a wearable computing device, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a short distance communication device, such as a Bluetooth device or a Near-Field Communication (NFC) device configured to communicate with other devices located near the user device 110. The Bluetooth device may implement low energy Bluetooth (BLE) communication. For example, user device 110 may communicate with wearable device 104 via BLE or NFC communication to indicate whether the wearable device is worn by the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes service providers as well as banks and retailers. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. In an embodiment, the account information 185 also may include information about wearable devices of the user 105 that are associated with the user account of the user 105 and that may be used to provide user authentication for accessing the user account. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
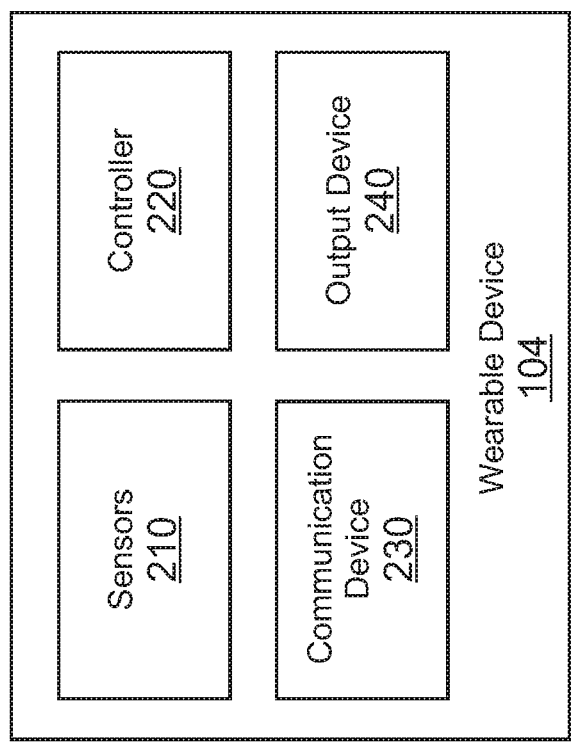
FIG. 2 is a block diagram of a wearable device suitable for implementing user authentication according to one embodiment.

FIG. 2 is a block diagram of a wearable device suitable for implementing user authentication according to one embodiment. Wearable device 104 may be a wearable item that may be worn by the user 105 or be attached to the user 105 or other items carried by the user 105. As such, the wearable device 104 may be a personal item to the user 105 that is worn or carried by the user 105. The wearable device 105 may include a sensor 210 configured to detect whether the wearable device 105 is currently being worn by the user 105. In an embodiment, the sensor 210 may be an optical sensor configured to detect light, such as ambient light. The optical sensor may be provided on a surface of the wearable device 104 interfacing with the user 105, such that when the user 105 is wearing the wearable device 104, the optical sensor is covered and is not exposed to light or is exposed to minimal light. In an embodiment, the sensor may be a mechanical actuator, such as a mechanical button that can be depressed. The mechanical actuator may be provided on a surface of the wearable device 105 facing the user 105, such that when the user 105 is wearing the wearable device 105, the mechanical actuator is actuated or depressed, and when the wearable device 105 is separated from the user 105, the mechanical actuator is not actuated or is released.

In still another embodiment, the sensor 210 is a connector provided at a fastening portion of the wearable device. For example, the connector may be provided on a wrist band of a watch type wearable device 104 to detect when the wrist band is unbuckled. The connector may include two connecting portions that are selectively connected and disconnected based on whether the fastening portion of the wearable device is connected or not. Thus, the connector may detect that the watch type wearable device is unbuckled and taken off the user when the connector is disconnected.

In yet another embodiment, the sensor 210 is a pressure sensor or touch sensor, such as a capacitive or resistive touch screen configured to detect a pressure or a touch from the user. The pressure sensor or the touch sensor may be provided on a surface of the wearable device 104 facing the user 105's body part when the wearable device is worn by the user 105. Thus, the sensor may detect that the wearable device 104 is worn by the user 105 when the sensor 210 is continuously contacted or touched by a body part of the user 105.

In an embodiment, the sensor 210 is a temperature sensor configured to detect a temperature. The temperature sensor may be provided on a surface of the wearable device 104. In particular, the temperature sensor is configured to contact or come in close proximity to a body part of the user 105 and to detect a body temperature of the user when the wearable device 104 is worn by the user 105. When the wearable device 104 is taken off of the user 105 or is separated from the user 105, the temperature sensor may detect a drop of temperature from the user 105's body temperature to a lower temperature, such as an ambient temperature. Thus, the temperature sensor may detect whether the wearable device 104 is worn by the user 105.

In an embodiment, the sensor 210 may be a gyroscope or an accelerometer configured to detect an orientation and movement of the wearable device 104. In particular, whether the wearable device 104 is worn by the user 105 may be determined based on the movement patterns or orientations of the wearable device 104. For example, if the wearable device 104 experiences abnormal shock, such being dropped on the floor, the accelerometer may detect this abnormal shock which may be used to determine that the wearable device 104 is separated from the user 105. In another example, certain movement patterns may be established to be associated with the wearable device 104 being taken off from the user 105.

In some embodiments, the wearable device 104 may include one or more of the aforementioned types of sensors to detect whether the wearable device 104 is still worn by the user 105. Different combinations of sensors may be used in coordination with each other to provide better detections. For example, the optical sensor, the temperature sensor, and the accelerometer may be used together to provide more accurate detection of when the wearable device 104 is worn by the user 105 and when the wearable device 104 is taken off from the user 105.

The wearable device 104 may include a communication device 230 configured to communicate with other devices. The communication device 230 may include a short range communication device, such as a Bluetooth or Bluetooth Low Energy (BLE) communication device, a Near-Field Communication (NFC) device, WiFi, or a combination thereof. In an embodiment, the communication device 230 may include a signal emitter configured to emit a wireless signal, without receiving communication from others. The communication device 230 may be configured to emit a unique wireless signal including unique patterns and/or frequencies, without a signal receiver. As such, the wearable device 104 may remain compact and low cost. In another embodiment, the communication device 230 may be configured to include a signal transmitter and a signal receiver to emit and receive communication signals. The signal range of the communication device 230 may be limited to a few feet, such that nearby devices may detect and/or communicate wirelessly.

The wearable device 104 may include a controller 220 configured to manage and control various operations of the wearable device 104. The controller 220 may include a microprocessor, an integrated circuit, or a combination thereof. The controller 220 may be configured or programmed to receive signals from the sensors 210 and make determinations or decisions regarding controlling the operations of other devices, such as a communication device 230 and/or the output device 240. For example, based on the signals received from the sensors, the controller 220 may determine whether the wearable device 104 is still worn by the user and may control the communication device 230 to emit signals accordingly.

The wearable device 104 also may include an output device 240 configured to communicate with user 105. For example, output device 240 may be an audio signal emitter configured to emit audio signals to the user 105. In another example, output device 240 may be an LED component configured to provide visual output. In still another example, output device 240 may be a vibration device configured to vibrate to communicate with user 105. In some embodiments, output device 240 may include one or more types of different output devices, such as a combination of an LED component and an audio signal emitter to provide different types of outputs to the user 105.

The wearable device 104 may be powered by a battery, which may be a rechargeable battery. For example, the wearable device 104 may be powered by solar battery or by kinetic energy, such as the movement of user 105. In another example, the wearable device 104 may be powered by replaceable batteries.

FIG. 3A is a diagram illustrating a perspective front view of a watch type wearable device 104a according to one embodiment. The watch type wearable device 104a may include a watch case 310 within which various components, such as sensors 210, controller 220, communication device 230 and output device 240, are disposed. The watch case 310 may include a front surface configured to display time. The front surface may be a glass surface and may include a touch screen configured to receive inputs from the user 105. The watch type wearable device 104a also may include fastening portions 312 configured to fasten the watch type wearable device 104a to the user 105.

FIG. 3B is a diagram illustrating a perspective rear view of the watch type wearable device 104a of FIG. 3A according to one embodiment. The rear surface of the watch case 310 may include a sensor 210b. When the watch type wearable device 104a is worn by the user 105 or fastened to the user 105, the rear surface may contact the user 105, such as a wrist of the user 105. The sensor 210b provided on the rear surface also may contact the user 105. The sensor 210b may be one or more of a pressure sensor, a contact sensor, a temperature sensor, an actuator type sensor, and the like that is configured to detect the user 105 when the watch type wearable device 104a is worn by the user 105 and the sensor 210b comes into contact with the user 105.

The watch type wearable device 104a may also include sensors 210a provided at the fastening portion 312 of the watch type wearable device 104a. The sensors 210a may be a connector type sensor configured to detect connection and disconnection of the fastening portions' 312 when the watch type wearable device 104a is selectively fastened to and taken off from user 105. When the watch type wearable device 104a is fastened to the user 105 as detected by sensors 210a and/or 210b, the watch type wearable device 104a may emit a signal indicating that the wearable device 104a is still worn by the user 105.

Figure 3C:
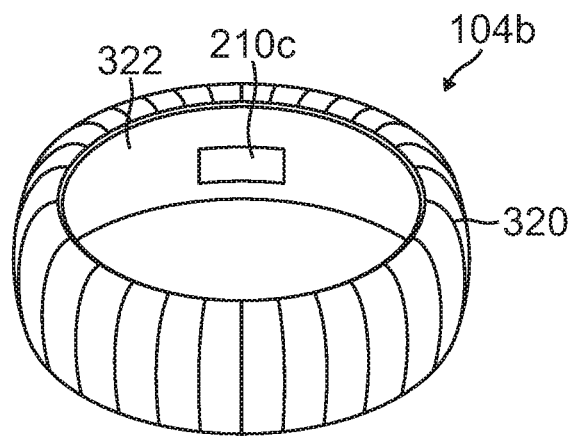
FIG. 3C is a diagram illustrating a perspective view of a band type wearable device according to one embodiment.

FIG. 3C is a diagram illustrating a perspective view of a band type wearable device 104b according to one embodiment. The band type wearable device 104b may include a band body 320 within which various components, such as sensors 210, controller 220, communication device 230 and output device 240, are disposed. The band body 320 may include an inner surface 322 configured to contact the user 105 when the band type wearable device 104b is worn by the user 105.

The inner surface 322 of the band body 320 may include a sensor 210c. When the band type wearable device 104b is worn by the user 105 or fastened to the user 105, the inner surface 322 may contact the user 105, such as a wrist of the user 105. The sensor 210c provided on the inner surface 322 also may contact the user 105. The sensor 210c may be one or more of a pressure sensor, a contact sensor, a temperature sensor, an actuator type sensor, and the like that is configured to detect the user 105 when the band type wearable device 104b is worn by the user 105 and the sensor 210c comes into contact with the user 105. The band type wearable device 104b may be a functional wrist band or a jewelry piece, such as a wrist band, a neck collar, and the like.

Figure 3D:
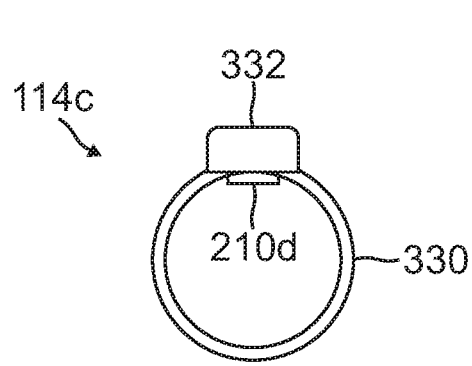
FIG. 3D is a diagram illustrating a perspective view of a ring type wearable device according to one embodiment.

FIG. 3D is a diagram illustrating a perspective view of a ring type wearable device 104c according to one embodiment. The ring type wearable device 104c may include a ring body 330 and a setting 332. Various components, such as sensors 210, controller 220, communication device 230 and output device 240, may be disposed in the ring body 330 and/or setting 332. A sensor 210d may be provided at the setting 332. When the ring type wearable device 104c is worn by the user 105, a bottom surface or inner surface of the ring body 33 and setting 332 may contact the user 105. The sensor 210d provided on the inner surface also may contact the user 105. The sensor 210d may be one or more of a pressure sensor, a contact sensor, a temperature sensor, an actuator type sensor, and the like that is configured to detect the user 105 when the ring type wearable device 104c is worn by the user 105 and the sensor 210d comes into contact with the user 105.

Figure 3E:
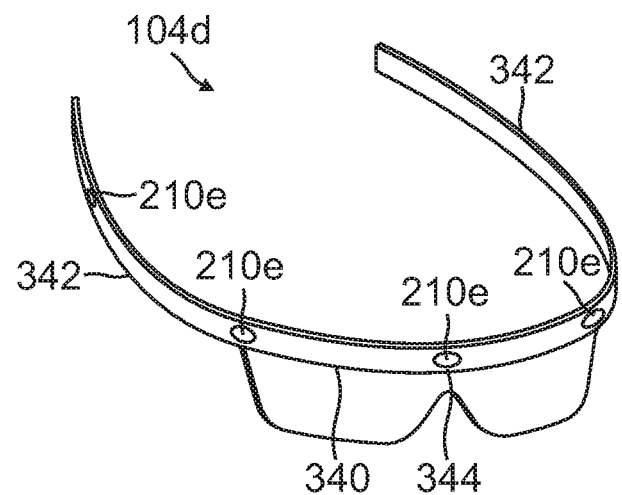
FIG. 3E is a diagram illustrating perspective view of a glasses type wearable device according to one embodiment.

FIG. 3E is a diagram illustrating perspective view of a glasses type wearable device 15) 104d according to one embodiment. The glasses type wearable device 104d may include an eyeglass frame including temple portions 342 connected to lens frames 340 via hinges 346. The lens frames 340 include a bridge portion 344. Various components, such as sensors 210, controller 220, communication device 230 and output device 240, may be disposed in the glass frame. In an example, sensors 210e may be provided on the bridge portion 344 to detect user contacts. Sensors 210e also may be provided on inner surfaces of temple portions 342 to detect user contacts. The sensor 210e may be one or more of a pressure sensor, a contact sensor, a temperature sensor, an actuator type sensor, and the like that is configured to detect contact with the user 105. In an embodiment, sensors 210e may be tension sensors provided at the hinges 346 to detect tensions at the hinges 346 when the glasses type wearable device 104d is worn by the user 105. Thus, various sensors may be provided to detect whether the glasses type wearable device 104d is worn by the user 105.

Figure 3F:
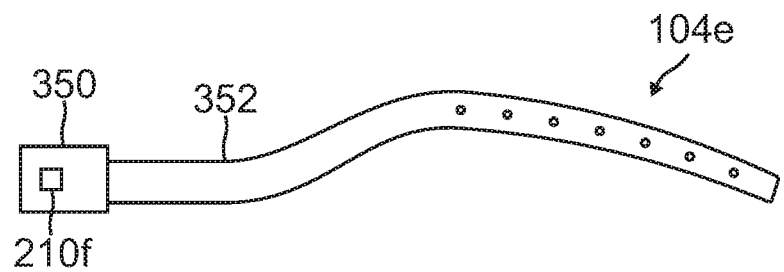
FIG. 3F is a diagram illustrating perspective view of a belt type wearable device according to one embodiment.

FIG. 3F is a diagram illustrating perspective view of a belt type wearable device 104e according to one embodiment. The belt type wearable device 104e may include a belt buckle portion 350 and a belt portion 352. Various components, such as sensors 210, controller 220, communication device 230 and output device 240, may be disposed in belt buckle portion 350. In an example, a sensor 210f may be provided at the belt buckle portion 350. The sensor 210f may be one or more of a pressure sensor, a contact sensor, a temperature sensor, an actuator type sensor, and the like that is configured to detect contact with the user 105.

Other types of wearable devices 104 that may be attached to or carried by the user 105 also may be utilized. For example, the wearable device 104 may be a clip configured to attach to the user 105 or items carried by the user 105. In another example, the wearable device 104 may be a tab that may be inserted or placed inside a bag or a wallet of the user 105.

Figure 5:
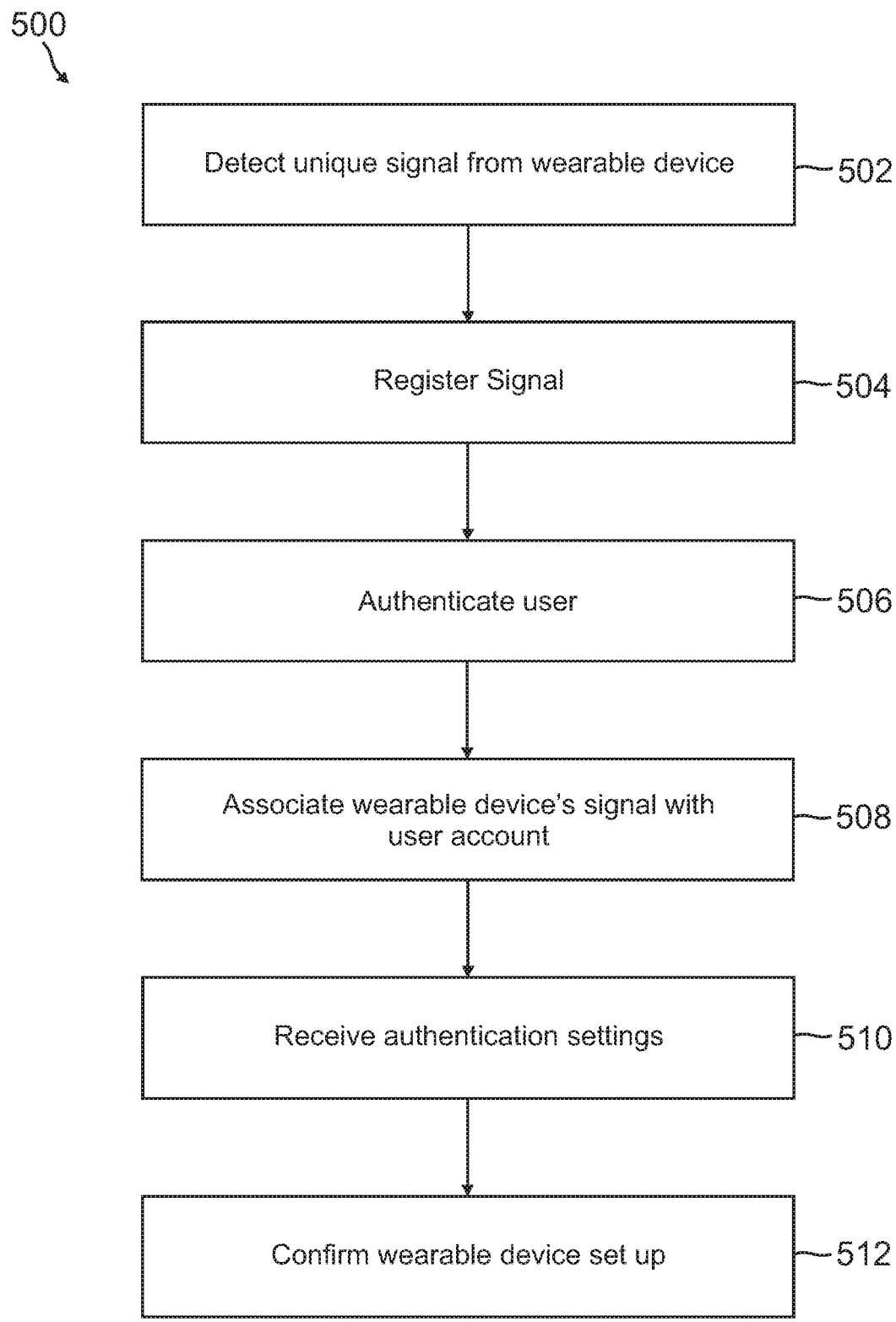
FIG. 5 is a flow chart illustrating a set up process for implementing user authentication via a wearable device according to one embodiment.

FIG. 5 is a flow chart illustrating a set up process 500 for implementing user authentication via a wearable device according to one embodiment. Initially, the 105 may put the wearable device 104 on and may turn on, if needed, the wearable device 104. The wearable device 104 may then detect, by one or more sensors 210, that the wearable device 104 is being worn by the user 105. The controller 220 of the wearable device 104 may then control the communication device 230 to generate and emit unique wireless signals. The unique wireless signals may be emitted at a particular frequency or pattern associated with the wearable device 104. For example, different types of wearable devices may have different frequencies or patterns. In another example, the unique signal may include information representing a unique device ID of the wearable device 104. The signal may be emitted periodically, such as every 5 seconds or every 10 seconds, as long as the wearable device 104 is worn by the user 105. The signal also may carry information related to the wearable device 104, such as type, name, ID, description, specification, and/or status (whether worn by the user) of the wearable device 104.

At step 502, the user device 110 may detect the unique signal emitted from the wearable device 104. For example, the user device 110 may be carried by the user 105 or the user 105 is currently using the user device 110. As such, the user device 110 may be located within the wireless broadcast range of the wearable device 104. At step 504, the user device 110 may register or receive the signal. The user device 110 may analyze the signal from the wearable device 104 and may determine that the signal is from a wearable device for user authentication. The user device 110 may ask the user 105 whether the user 105 would like to register the wireless signal for user authentication. If so, the user 105 may be allowed to designate one or more user accounts which may use the signal for user authentication. For example, the user may associate the wireless signal with user 105's payment account at a payment service provider. As such, the wireless signal may be used to authenticate user for that payment account.

At step 506, the user device 110 may authenticate user 105 for the designated account. For example, the user device 110 may ask for the user's login ID, password, finger-print scan, and the like. When the user 105 is authenticated successfully, the user device 110 may then associate the signals from the wearable device 104 with the designated accounts at step 508. As such, the unique signals from the wearable device 104 may be used to authenticate the user for the designated accounts.

At step 510, the user device 110 may allow the user 105 to select or input authentication settings for the designated accounts with regard to the signals. In particular, the user 105 may customize the authentication process for the designated accounts with regard to whether the unique signals are received by the user device 110, e.g., whether the wearable device 104 is worn by the user 105. For example, if the user device 110 determines that the user 105 is wearing the wearable device 104 based on the signals received from the wearable device 104, the user device 104 may keep the user 105 logged in as long as the user device 110 continues to receive signals from the wearable device indicating that the user 105 is still wearing the wearable device. The user device 110 may log user 105 out after a predetermined amount of time (which can be immediately) if the user device 110 no longer receives the signals from the wearable device 104.

In an embodiment, if the user device 110 detects the signals from the wearable device 104 indicating that the user 105 is wearing the wearable device 104, the user device 110 may automatically authenticate the user 105 or log the user 105 into the designated account without requiring credentials, such as passwords or login IDs. In still another embodiment, if the user device 110 detects the signals from the wearable device 104 indicating that the user 105 is wearing the wearable device 104, the user device 110 may require less credentials for authentication or have less strict security requirements. The user 105 may select and customize how the wearable device 104 may provide different features of user authentication for different user accounts.

In an embodiment, the user device 110 may allow the user to designate a combination of different signals from different wearable devices for a particular account. For example, automatic user authentication may be implemented for a particular account when the user device 110 detects that the user 105 is wearing both a particular ring type wearable device and a particular watch type wearable device. In an embodiment, different combinations of wearable devices may be designated for different authentication requirements. For example, when the user 105 is wearing a particular combination of three wearable devices, the authentication requirement may be less than when the user 105 is wearing two of the three wearable devices.

In an embodiment, one wearable device 104 may be used to provide authentication for multiple of user's accounts. For example, when the user 105 is wearing a particular watch type wearable device 104a, the user device 110 may keep the user 105 logged in at the user 105's bank account and at the user 105's shopping account. In another embodiment, different types of wearable devices 104 may provide different levels of authentication requirement. For example, wearing a ring-type wearable device 104c may allow automatic access to an account, while wearing a watch-type wearable device 104a may still require the user 105 to enter his/her user ID.

At step 512, the user device 110 may confirm set up with the user 105. For example, a notification may be provided on the user device 110 to inform the user 105 that a particular wearable device 104 is now set up for user authentication of a particular user's account. In another example, the output device 240 at the wearable device 104 may confirm the set up by beeping, LED flashing or color change, vibrations, or information display (on a screen). The user device 110 may store and update the authentication settings of various accounts of the user 105 and their respective associated wearable devices. The user device 110 may provide a user interface for the user 105 to update, add, delete, and/or modify the authentication settings related to wearable devices.

Figure 6:
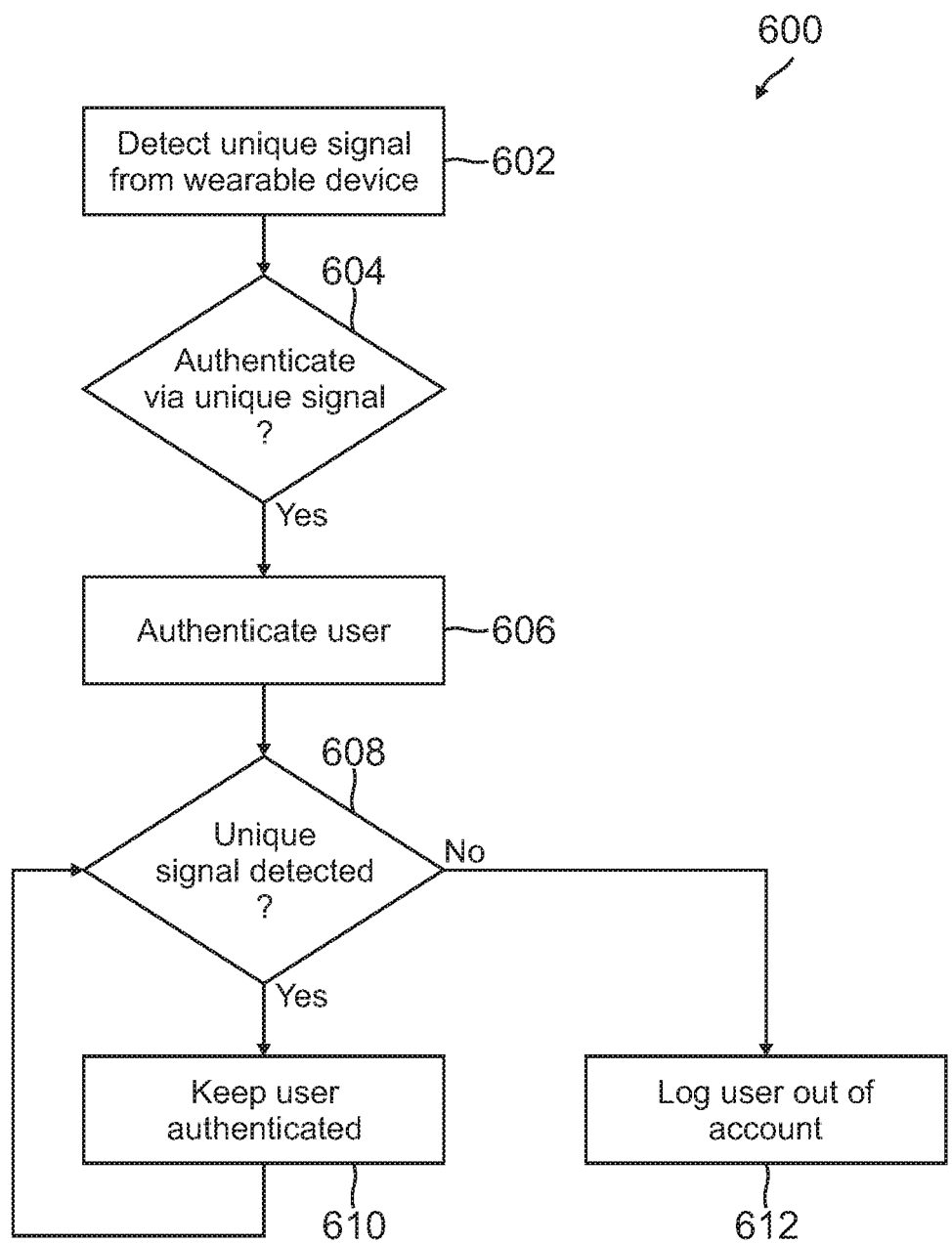
FIG. 6 is a flow chart illustrating a method for implementing user authentication via a wearable device according to one embodiment.

FIG. 6 is a flow chart illustrating a method 600 for implementing user authentication via a wearable device according to one embodiment. At step 602, the user device 110 may detect unique signals from a wearable device 104. For example, when the user 105 puts on the wearable device 104, the wearable device 104 may detect the user 105 via sensors 210 and may begin to emit the unique signals. In an embodiment, the wearable device 104 may previously have been registered with the user device 110, such that the wearable device 104 may automatically be paired with the user device 110, e.g., via Bluetooth communication.

At step 604, the user device 110 may determine whether the unique signals are for user authentication. In particular, the user device 110 may check and see if the received unique signals are associated with one or more of the user 105's accounts. If so, the user device 110 also may look up the authentication settings to determine how the unique signals may alter the authentication process for the account. At step 606, the user device 110 may authenticate the user 105 based on the authentication settings for the designated account in view of the detected signals. For example, if the user 105 has not been logged into the account, the user device 110 may log the user 105 in automatically without requiring user credentials in view of the signals received from the wearable device 104. If the user 105 already is logged into the account, the user device 110 may maintain the logged in session in view of the signals received from the wearable device 104.

At step 608, the user device 110 may determine whether the signals from the wearable device 104 are received continuously at the user device 110. For example, the wearable device 104 may emit the signals periodically, e.g., every few seconds. The user device 110 may determine whether the signals are received periodically from the wearable device 104 indicating that the user 104 still is wearing the wearable device 104. If the user device 110 continues to receive the signals from the wearable device 104, the user device 110 may keep the user 105 authenticated at step 610. For example, the user device 110 may keep the user 105 logged in at the account. In another example, the user device 110 may have a lower security requirement or authentication requirement for logging in when the user device 110 continuously receives the signals from the wearable device 104. The process then may go back to step 608 where the user device 110 continues to check whether the signals from the wearable device 104 still are detected at the user device 110.

If the user device 110 stops receiving the signals from the wearable device 104 which indicates that the wearable device is taken off from the user 105 or is separated from the user 105, the user device 110 may log user 105 out of the account or stop authenticating the user 105 immediately or within a certain time period, which may depend on user, system, and/or account settings. In another example, the user device 110 may require higher or stricter authentication requirements when the user 105 is not wearing the wearable device 104.

After the wearable device 104 has been taken off from the user 105, the user device 110 may require that the user 105 provide authentication credentials to log in again even if the wearable device 104 has been put back on the user 105. This may ensure that the wearable device 104 is not worn by another user for the purpose of unauthorized access to the user's account.

By implementing processes 500 and 600, a wearable device 104 may be provided to facilitate easier and safer authentication process for the user 105. In particular, the wearable device 104 may include sensors that may detect whether the wearable device 104 is worn or attached to the user 105. The wearable device 104 may be configured to emit signals indicating that the wearable device 104 is worn by the user 105. Based on the status of the wearable device 104, the user device 110 may allow automatic or easier authentication process for the user's account. The automatic or easier authentication may end once the wearable device 104 is taken off from the user 105 to provide security to the user's account.

In the above embodiments, the wearable device 104 is utilized for authentication into user's accounts at the user device 104. In another embodiment, the wearable device 104 may be utilized for user authentication for access into buildings, areas, events, vehicles, transportation networks, and any location where user authentication is required.

Figure 4:
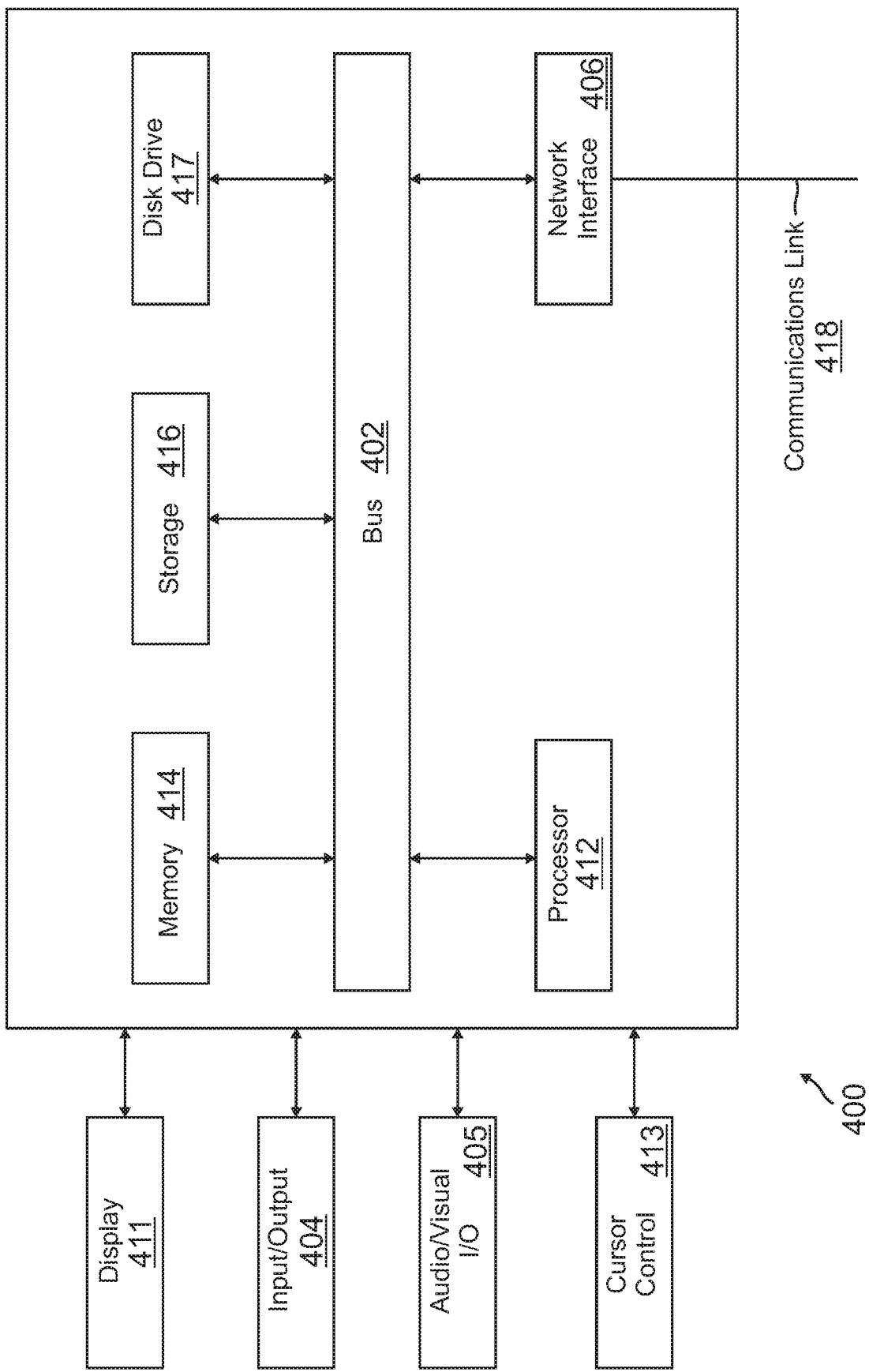
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, Bluetooth device, key FOB, badge, wearable computing device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory comprising instructions; and
one or more hardware processors coupled to the non-transitory memory and configured to read the instructions to cause the system to perform operations comprising:
detecting, from a user device, a request for access to a first user account of a user;

detecting, via the user device, a first signal received from a first wearable device of the user when the first wearable device determines that it is being worn by the user;

detecting, via the user device, a second signal received from a second wearable device of the user when the second wearable device determines that it is being worn by the user;

authenticating the user based on the first signal and the second signal;

providing the user device with access to the first user account;

monitoring the first signal and the second signal; and logging the user device out of the first user account after a period of time in response to detecting the first signal or the second signal has ended based on the monitoring.

2. The system of claim 1, wherein the detecting the first signal is in response to the first wearable device determining that an actuator on the first wearable device has been depressed.

3. The system of claim 1, wherein the detecting the first signal is in response to the first wearable device determining that a temperature sensor located on the first wearable device detects a temperature associated with the user.

4. The system of claim 1, wherein the first signal is unique to the first wearable device.

5. The system of claim 1, wherein the first wearable device is configured to transmit the first signal periodically when the first wearable device determines that it is being worn by the user.

6. The system of claim 1, wherein the first user account is associated with a first authentication level that is different from a second authentication level associated with a second user account of the user.

7. The system of claim 6, wherein the first authentication level includes detecting the first signal from the wearable device, and wherein the second authentication level includes detecting the first signal from the first wearable device and the second signal from the second wearable device associated with the user.

8. A non-transitory machine-readable medium having stored thereon machine-readable instructions executable to cause a machine to perform operations comprising:

detecting, from a user device, a request for access to a first user account of a user;

detecting, via the user device, a first signal received from a first wearable device of the user when the first wearable device determines that it is being worn by the user; and detecting, via the user device, a second signal received from a second wearable device of the user when the second wearable device determines that it is being worn by the user;

authenticating the user based on the first signal and the second signal;

providing the user device with access to the first user account;

monitoring the first signal and the second signal; and logging the user device out of the first user account after a period of time in response to detecting the first signal or the second signal has ended based on the monitoring.

9. The non-transitory machine-readable medium of claim 8, wherein the detecting the first signal is in response to the first wearable device determining that-an actuator on the first wearable device has been depressed.

10. The non-transitory machine-readable medium of claim 8, wherein the detecting the first signal is in response to the first wearable device determining that temperature sensor located on the first wearable device detects a temperature associated with the user.

11. The non-transitory machine-readable medium of claim 8, wherein the first signal is unique to the first wearable device.

12. The non-transitory machine-readable medium of claim 8, wherein the first wearable device is configured to transmit the first signal periodically when the first wearable device determines that it is being worn by the user.

13. The non-transitory machine-readable medium of claim 8, wherein the first user account is associated with a first authentication level that is different from a second authentication level associated with a second user account of the user.

14. A method, comprising:

detecting, from a user device, a request for access to a first user account of a user;

detecting, via the user device, a first signal received from a first wearable device of the user when the first wearable device determines that it is being worn by the user; and detecting, via the user device, a second signal received from a second wearable device of the user when the second wearable device determines that it is being worn by the user;

authenticating the user based on the first signal and the second signal;

providing the user device with access to the first user account;

monitoring the first signal and the second signal; and logging the user device out of the first user account after a period of time in response to detecting the first signal or the second signal has ended based on the monitoring.

15. The method of claim 14, wherein the wearable device wherein the detecting the first signal is in response to the first wearable device determining that actuator on the first wearable device has been depressed.

16. The method of claim 14, wherein the detecting the first signal is in response to the first wearable device determining that temperature sensor located on the first wearable device detects a temperature associated with the user.

17. The method of claim 14, wherein the first signal is unique to the first wearable device.

18. The method of claim 14, wherein the first wearable device is configured to transmit the first signal periodically when the first wearable device determines that it is being worn by the user.

19. The method of claim 14, wherein the first user account is associated with a first authentication level that is different from a second authentication level associated with a second user account of the user.

20. The method of claim 19, wherein the first authentication level includes detecting the first signal from the first wearable device, and wherein the second authentication level includes detecting the first signal from the wearable device and the second signal from the second wearable device associated with the user.

* * * * *